(12) United States Patent
Escaro et al.

(10) Patent No.: US 11,227,205 B2
(45) Date of Patent: Jan. 18, 2022

(54) ANTENNA PATTERN, RFID INLAY, RFID LABEL, AND RFID MEDIUM

(71) Applicant: SATO HOLDINGS KABUSHIKI KAISHA, Tokyo (JP)

(72) Inventors: Rodly Escaro, Tokyo (JP); Yoshimitsu Maeda, Saitama (JP); Faiz Adi Ezarudin Bin Adib, Kanagawa (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/961,023

(22) PCT Filed: Jan. 31, 2019

(86) PCT No.: PCT/JP2019/003509
§ 371 (c)(1),
(2) Date: Jul. 9, 2020

(87) PCT Pub. No.: WO2019/163473
PCT Pub. Date: Aug. 29, 2019

(65) Prior Publication Data
US 2020/0373674 A1    Nov. 26, 2020

(30) Foreign Application Priority Data
Feb. 21, 2018  (JP) .............................. JP2018-029074

(51) Int. Cl.
*G06K 19/077* (2006.01)
*H01Q 1/22* (2006.01)
(Continued)

(52) U.S. Cl.
CPC ... *G06K 19/07794* (2013.01); *G06K 19/0723* (2013.01); *G06K 19/0776* (2013.01);
(Continued)

(58) Field of Classification Search
CPC ........ H01Q 1/2225; H01Q 1/38; H01Q 9/285; H01Q 9/24; H01Q 9/26; H01Q 9/065;
(Continued)

(56) References Cited

U.S. PATENT DOCUMENTS

2018/0039878 A1*  2/2018  Akamatsu .............. H01Q 19/22

FOREIGN PATENT DOCUMENTS

| EP | 2 866 172 A1 | 4/2015 |
| EP | 2 866 298 A1 | 4/2015 |

(Continued)

*Primary Examiner* — Robert Karacsony
(74) *Attorney, Agent, or Firm* — Foley & Lardner LLP

(57) ABSTRACT

An antenna pattern used in a UHF frequency band RFID inlay is provided with a substance; a dipole antenna formed from a metal foil upon the front surface of the substance; and a sub-element formed from a metal foil upon the back surface of the substance, wherein the dipole antenna is provided with a loop portion having a IC chip connecting portion; a pair of meanders configured to respectively extend from the loop portion so as to be line symmetrical; and capacitance hats, the sub-element has a pair of U-shapes, and a part of the sub-element overlaps with the dipole antenna through the substance.

10 Claims, 13 Drawing Sheets

(51) Int. Cl.
*H01Q 1/38* (2006.01)
*H01Q 9/28* (2006.01)
*G06K 19/07* (2006.01)
*H01Q 9/24* (2006.01)

(52) U.S. Cl.
CPC ... *G06K 19/07722* (2013.01); *G06K 19/07786* (2013.01); *H01Q 1/2225* (2013.01); *H01Q 1/38* (2013.01); *H01Q 9/24* (2013.01); *H01Q 9/285* (2013.01)

(58) Field of Classification Search
CPC ............... H01Q 9/16; G06K 19/07786; G06K 19/07794; G06K 19/0723; G06K 19/07722; G06K 19/0776; G06K 19/077
See application file for complete search history.

(56) References Cited

FOREIGN PATENT DOCUMENTS

| | | |
|---|---|---|
| JP | 2010-237853 A | 10/2010 |
| JP | 2014-057130 A | 3/2014 |

\* cited by examiner

ANTENNA PATTERN, RFID INLAY, RFID LABEL, AND RFID MEDIUM

TECHNICAL FIELD

The present invention relates to an antenna pattern applied to a UHF frequency band RFID, an RFID inlay, an RFID label, and an RFID medium.

BACKGROUND ART

In the field of manufacture, management, logistics, and so forth of products, tags that are attached to the products and labels that are adhered to the products, etc. are used. Information related to the products are printed on the tags and the labels so as to be visible. In recent years, a technique utilizing an RFID (Radio Frequency Identification), in which identification information written on an IC chip is transmitted and received via a wireless communication, is becoming more and more common in various fields, and the technique is also becoming more familiar in the above-described fields.

On the tag, the label, an wrist band, and so forth (hereinafter, referred to as an RFID medium) incorporated an antenna pattern and the IC chip with an RFID specification as described above, information related to a target for attachment, a target for affixation, or an wearer (hereinafter, collectively referred to as an adherend) is printed so as to be visible, and it is possible to store various information related to the adherend in the incorporated IC chip.

As an example of an RFID inlay, a UHF frequency band RFID inlay having an IC chip, a loop portion connected with the IC chip, and a dipole antenna connected with the loop portion has been disclosed (see JP2010-237853A).

SUMMARY OF INVENTION

The RFID inlay described in JP2010-237853A has a directivity in which a good gain is obtained in the crossing direction with respect to the direction in which the dipole antenna extends, but the gain is poor in the direction in which the dipole antenna extends, and there is a problem in that, when a reader/writer is located in the latter direction, a transmission and reception of data becomes unstable.

Therefore, in a case in which the RFID inlay is applied to, for example, an application in which entrance and exit of a holder of "ID-1" standard card specified in ISO/IEC 7810 is managed by mounting the RFID inlay on the card and an application in which a timing of finishing of a competitor is recorded by affixing the RFID inlay to a numbered bib, etc. of the competitor, there has been a problem in that transmission and reception of information cannot be performed correctly depending on an orientation of the RFID inlay or a positional relationship between the RFID inlay and an RFID reader.

Thus, an object of the present invention is to increase a direction and range capable of performing transmission and reception by improving directivity of an antenna in a UHF frequency band RFID inlay.

According to an aspect of the present invention, provided is an antenna pattern used for a UHF frequency band RFID inlay, the antenna pattern comprising: a substrate; a dipole antenna formed on a front surface of the substrate with a metal foil; and a sub-element formed on a back surface of the substrate with the metal foil, wherein the dipole antenna is provided with: a loop portion having an IC chip connecting portion to which an IC chip is connected; a pair of meanders configured to respectively extend from the loop portion so as to be line symmetrical by being connected to the loop portion at end portions on one side; and capacitance hats respectively connected to the pair of meanders, and the sub-element has a pair of U-shapes, the sub-element being arranged such that opening sides of the U-shapes face with each other so as to be line symmetrical, the sub-element being formed such that a part thereof overlaps with the dipole antenna through the substrate.

According to the above-described aspects, it is possible to increase a direction and range capable of performing transmission and reception by improving a directivity of the UHF frequency band RFID antenna.

DESCRIPTION OF EMBODIMENTS

[RFID Inlay and Antenna Pattern]

First Embodiment

The RFID inlay 1 and an antenna pattern 10 according to a first embodiment of the present invention will be described. The RFID inlay 1 in this embodiment is a UHF frequency band RFID inlay.

Figure 1A:
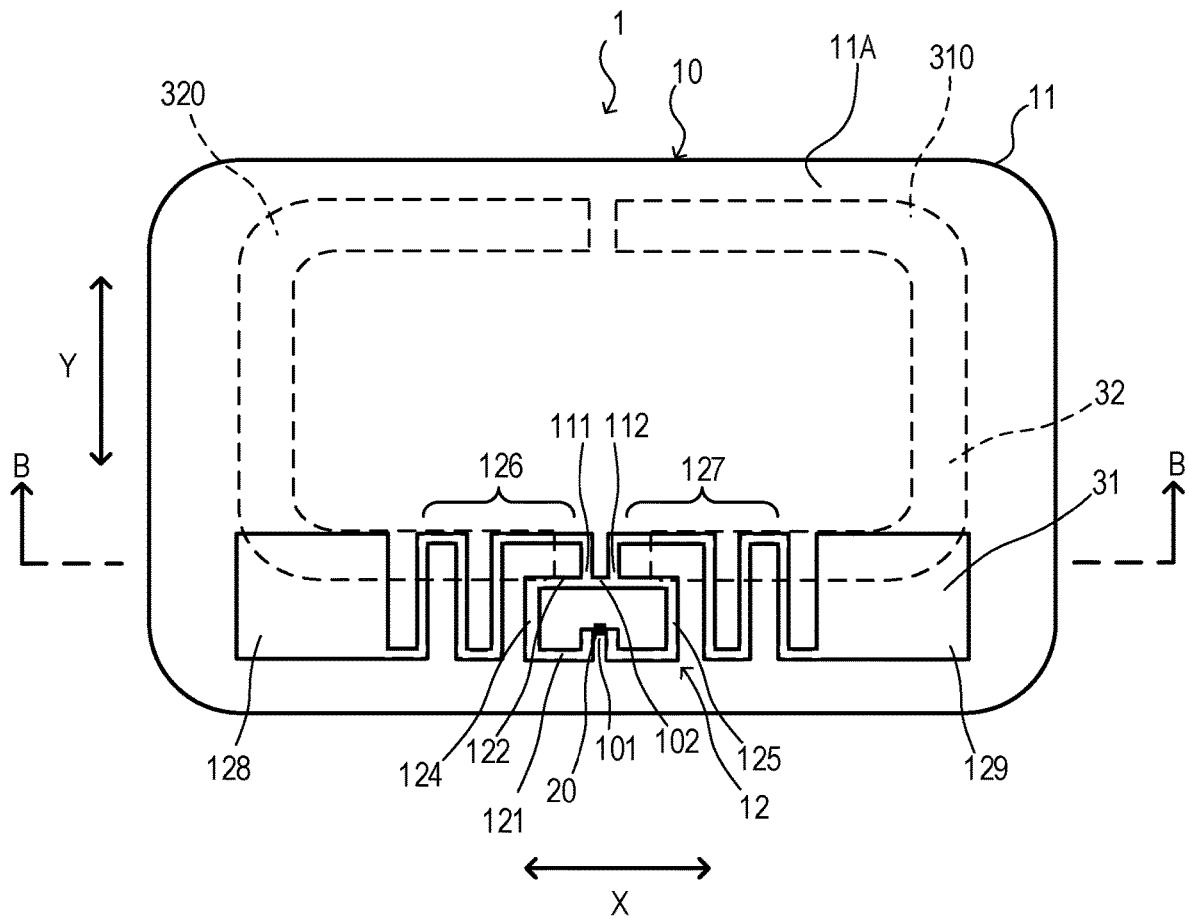
FIG. 1A is an external view for explaining a front surface of an RFID inlay according to a first embodiment.
Figure 1B:
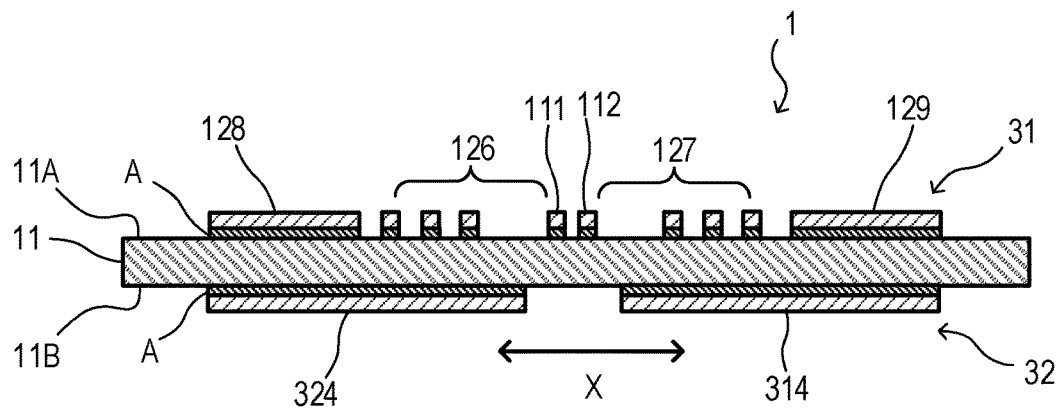
FIG. 1B is a sectional view taken along a line B-B in FIG. 1A.
Figure 2:
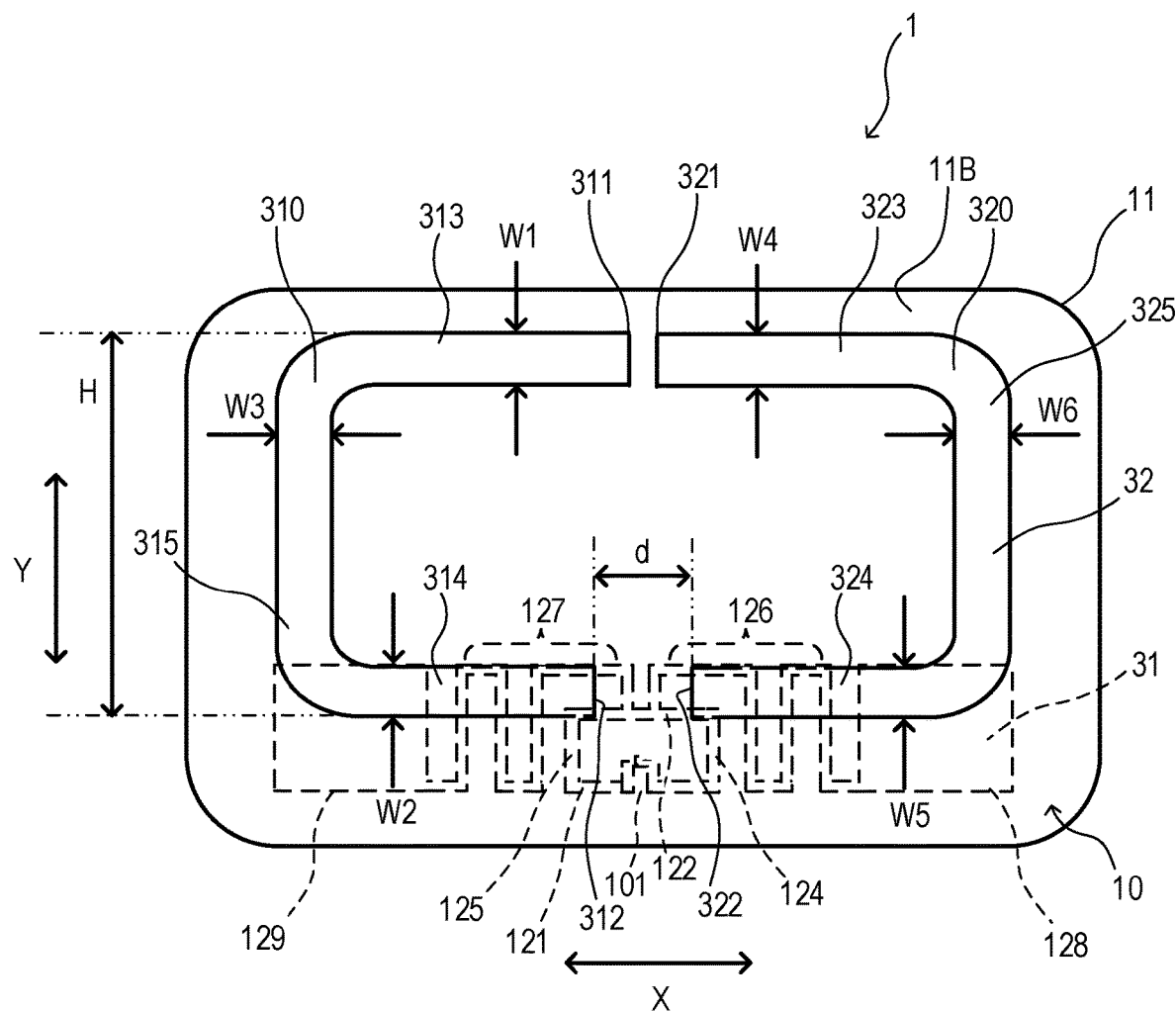
FIG. 2 is an external view for explaining a back surface of the RFID inlay according to the first embodiment.

FIG. 1A is an external view for explaining a front surface of the RFID inlay 1 according to the first embodiment, and FIG. 1B is a sectional view taken along a line B-B in FIG. 1A. In addition, FIG. 2 is an external view for explaining a back surface of the RFID inlay 1 according to the first embodiment.

In this embodiment, in the RFID inlay 1, an IC chip 20 with an RFID (Radio Frequency Identification) specification is bonded to the antenna pattern 10 by a vulcanization bonding, etc. using an anisotropic conductive paste or a conductive film.

The antenna pattern 10 is provided with a dipole antenna 31 that is formed on a front surface 11A of a substrate 11 with a metal foil and a sub-element 32 that is formed on a back surface 11B of the substrate 11 with the metal foil. As shown in FIG. 1B, the dipole antenna 31 and the sub-element 32 are laminated on the substrate 11 with an adhesive agent A.

In FIG. 1, the sub-element 32 that is formed on the back surface 11B is illustrated with a dotted line. In addition, in FIG. 2, the dipole antenna 31 that is formed on the front surface 11A is illustrated with a dotted line.

In this embodiment, the direction in which the dipole antenna 31 extends is described as the X direction of the RFID inlay 1, and the direction perpendicular to the X direction is described as the Y direction of the RFID inlay 1.

The dipole antenna 31 has a loop portion 12 that is formed on the front surface 11A of the substrate 11 with the metal foil and that has an IC chip connecting portion 101 to which the IC chip 20 is connected. The loop portion 12 is formed on the front surface 11A of the substrate 11 with the metal foil and has the IC chip connecting portion 101 to which the IC chip 20 is connected and a power feeding portion 102 to which meander end portions 111 and 112 of the dipole antenna 31 are connected. The loop portion 12 is formed to have a loop shape that is line symmetrical with respect to a line that passes through the IC chip connecting portion 101 and that is parallel to the Y direction.

In this embodiment, the loop portion 12 is formed to have a rectangular shape and has a pair of long-side portions 121 and 122 facing with each other. In addition, the loop portion 12 has a pair of short-side portions 124 and 125 that respectively connect end portions of the long-side portions 121 and 122 with each other.

In the loop portion 12, the IC chip connecting portion 101 is formed at the center portion of the long-side portion 121 on one side, and the power feeding portion 102 is formed towards the center portion side of the long-side portion 122 facing the long-side portion 121 on which the IC chip connecting portion 101 is formed.

In this embodiment, the dipole antenna 31 is formed in left-right symmetry with respect to the IC chip 20. The dipole antenna 31 has, on the front surface 11A, meanders 126 and 127 that are formed so as to extend in the opposite directions with each other with respect to the loop portion 12, and capacitance hats 128 and 129 that are connected to the meanders 126 and 127, respectively. In the above, connecting ends of the meanders 126 and 127 to the loop portion 12 correspond to the meander end portions 111 and 112, respectively.

Number of folded portions, curvature radius of curved portions, lengths of the respective portions in the meanders 126 and 127 are set in consideration of an antenna efficiency.

Next, the sub-element 32 will be described with reference to FIG. 2. In FIG. 2, the components formed on the front surface 11A are illustrated with dotted lines.

The sub-element 32 formed on the back surface 11B has an element 310 on one side and an element 320 on the other side, and the element 310 and the element 320 each has U-shape and are formed such that their opening sides face each other so as to be in line symmetrical with respect to a line that passes through the IC chip 20 and that is parallel to the Y direction of the RFID inlay 1.

In this embodiment, the element 310 has parallel portions 313 and 314 that are formed in parallel with the X direction in which the dipole antenna 31 extends and a perpendicular portion 315 that joins end portions of the parallel portions 313 and 314. In addition, the element 320 has parallel portions 323 and 324 that are formed in parallel with the X direction in which the dipole antenna 31 extends and a perpendicular portion 325 that joins end portions of the parallel portions 323 and 324.

Also, the elements 310 and 320 having the U-shape are formed so as to be symmetrical with each other such that end portions (tip end portions) 311 and 321 on one side oppose to each other and end portions (base end portions) 312 and 322 on the other side oppose to each other. In addition, in this embodiment, the base end portions 312 and 322 are formed so as to overlap with parts of the loop portion 12 through the substrate 11.

The elements 310 and 320 formed in a U-shape have a gap formed by the base end portions 312 and 322 facing each other and a gap formed by the tip end portion s 311 and 321 facing each other. The IC chip connecting portion 101 of the loop portion 12 is positioned so as to overlap the gap formed by the base end portions 312 and 322 through the substrate 11.

In this embodiment, the widths W1 and W2 of the parallel portions 313 and 314 and the width W3 of the perpendicular portion 315 in the element 310, and the widths W4 and W5 of the parallel portions 323 and 324 and the width W6 of the perpendicular portion 325 in the element 320 are all formed so as to have the same width.

In the elements 310 and 320, the length H in the longitudinal direction Y including the widths of the respective elements and the widths W1 to W6 of the respective parts in the elements can be set in consideration of the antenna efficiency.

As described below, the dipole antenna 31 and the sub-element 32 described above are formed on the substrate 11.

In the first embodiment, a part of the sub-element 32 is formed so as to overlap with a part of the dipole antenna 31 through the substrate 11 and so as to overlap with a part of the long-side portion 122 on which the power feeding portion 102 is formed.

More specifically, the parallel portion 314 in the element 310 is formed so as to overlap with a part of the dipole antenna 31 on the upper side in the Y direction on the drawings over a region from the capacitance hat 129 to the meander 127.

In addition, similarly, the parallel portion 324 in the element 320 is formed so as to overlap with a part of the dipole antenna 31 on the upper side in the Y direction on the drawings over a region from the capacitance hat 128 to the meander 126.

In addition, a gap d between the base end portions 312 and 322 of the sub-element 32 facing with each other is formed at the position so as to sandwich the IC chip connecting portion 101 and the power feeding portion 102 in the loop portion 12 formed on the front surface 11A through the substrate 11.

In this embodiment, as a material applicable as the substrate 11 includes papers such as fine quality paper, coated paper, and so forth; and a single film made of a resin such as polyvinyl chloride, polyethylene terephthalate, polypropylene, polyethylene, polyethylene naphthalate, and so forth, and a multilayer film formed by laminating a plurality of the resin films.

The thickness of the substrate 11 is preferably from 25 μm to 300 μm, inclusive. In a case in which the papers are used as the substrate, the thickness can be from 50 μm to 260 μm, inclusive, in the above-described range, and it is generally preferable that the thickness be 80 µm. In addition, in a case in which the resin film is used as the substrate, the thickness can be from 25 µm to 200 µm, inclusive, in the above-described range. From the above, it is possible to make an appropriate selection depending on an application purpose.

In this embodiment, in general, as a metal for forming the metal foil that is used for forming the loop portion 12 and the dipole antenna 31, an electrically conductive metal used for forming the antenna pattern can be applied.

One example thereof includes copper and aluminum. In view of suppressing the manufacturing cost, it is preferable to use aluminum. In addition, in view of an overall thickness of the RFID inlay 1, of an overall thickness of the RFID medium when the RFID medium is formed, and of the manufacturing cost, it is preferable that a thickness of the metal foil be from 3 µm to 25 µm, inclusive. More preferably, the metal foil is an aluminum foil having the thickness of 20 µm.

In this embodiment, the metal foil is adhered to the substrate 11 with the adhesive agent A.

In addition, in this embodiment, the dipole antenna 31 in the antenna pattern 10 is designed as a pattern adapted to a UHF frequency band (300 MHz to 3 GHz, especially, 860 MHz to 960 MHz).

Effects of First Embodiment

With a conventional dipole antenna, the gain is poor in the longitudinal direction of the antenna (the X direction when associated with FIG. 1), and transmission and reception sensitivity in this direction is lowered.

In contrast, the RFID inlay 1 according to the first embodiment is provided with the sub-element 32. The sub-element 32 is formed so as to overlap with a part of the dipole antenna 31 through the substrate 11 and so as to overlap with a part of the long-side portion 122 in which the power feeding portion 102 is formed. With such a configuration, it is possible to increase the gain in the X direction in FIGS. 1 and 2 and to increase the transmission and reception sensitivity in the X direction.

As described above, the sub-element 32 has a function of compensating the gain of the dipole antenna 31 such that the RFID inlay 1 functions as an omnidirectional antenna.

In addition, the elements 310 and 320 are formed such that all of their widths W1 to W6 are the same, and thereby, it is possible to keep an impedance in a transmission line in the elements 310 and 320 constant and to increase the antenna efficiency.

Second Embodiment

An RFID inlay 2 and an antenna pattern 40 according to a second embodiment of the present invention will be described. In the second embodiment, a positional relationship between the dipole antenna 31 and a sub-element 33 is modified. In other words, the length H of the sub-element 33 in the Y direction is longer than that of the sub-element 32. In addition, the gap d between base end portions 332 and 342 is reduced.

Figure 3:
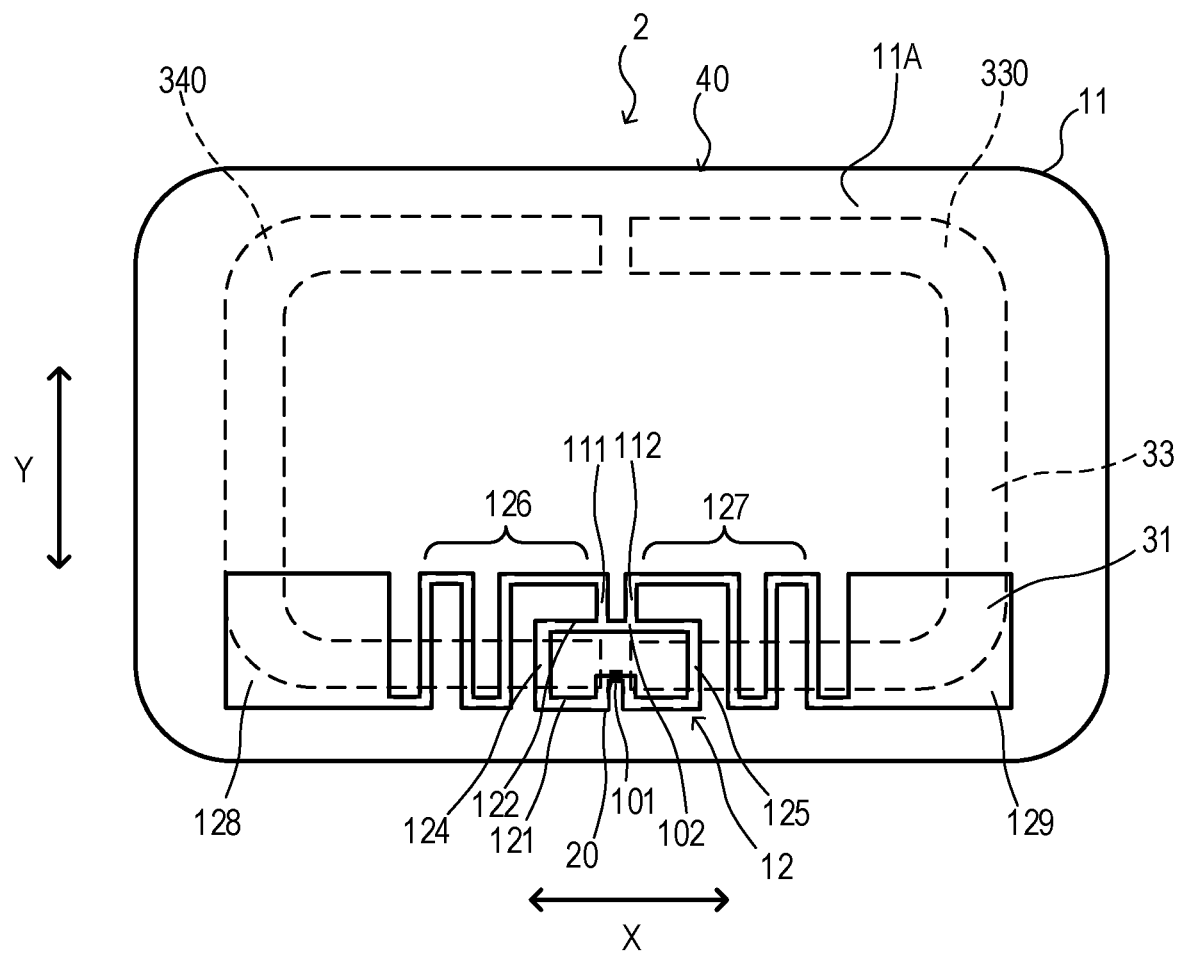
FIG. 3 is an external view for explaining a front surface of the RFID inlay according to a second embodiment.
Figure 4:
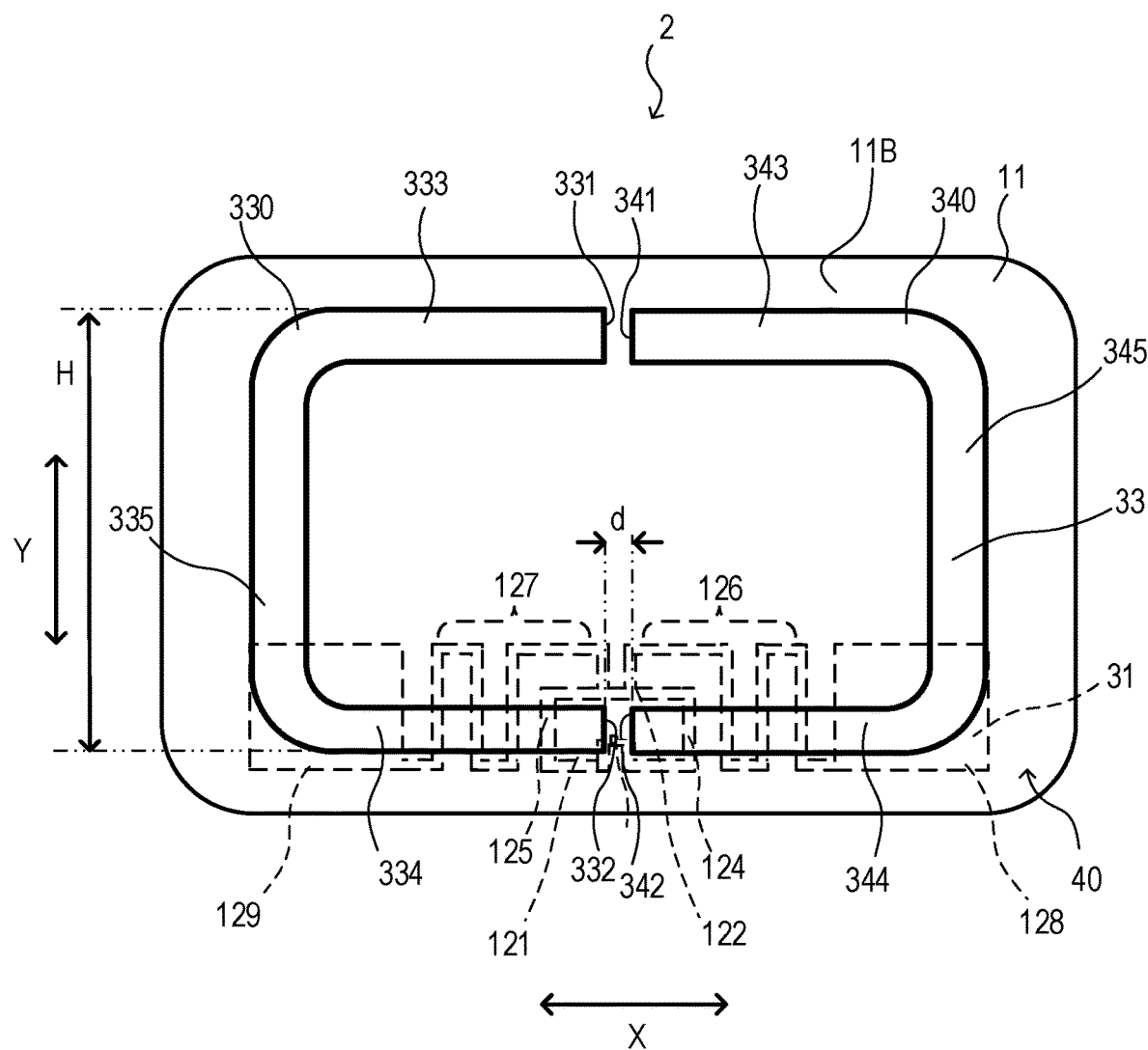
FIG. 4 is an external view for explaining the back surface of the RFID inlay according to the second embodiment.

FIG. 3 is an external view for explaining a front surface of the RFID inlay 2 according to the second embodiment. In addition, FIG. 4 is an external view for explaining a back surface of the RFID inlay 2 according to the second embodiment. Configurations that have the same functions as the configurations shown in the first embodiment are assigned the same reference signs, and detailed descriptions thereof shall be omitted.

In the RFID inlay 2 that is shown as the second embodiment, the antenna pattern 40 has the substrate 11, the loop portion 12 that is formed on the front surface 11A of the substrate 11 with the metal foil, the dipole antenna 31 that is formed on the front surface 11A of the substrate 11 with the metal foil, and the sub-element 33 that is formed on the back surface 11B.

As shown in FIG. 4, the sub-element 33 that is formed on the back surface 11B has a left-right symmetric U-shapes on the back surface 11B and has an element 330 on one side and an element 340 on the other side.

The element 330 has parallel portions 333 and 334 that are formed in parallel with the X direction in which the dipole antenna 31 extends and a perpendicular portion 335 that joins end portions of the parallel portions 333 and 334. In addition, the element 340 has parallel portions 343 and 344 that are formed in parallel with the X direction in which the dipole antenna 31 extends and a perpendicular portion 345 that joins end portions of the parallel portions 343 and 344.

The elements 330 and 340 are formed so as to be symmetrical with each other such that the end portions (the tip end portions) 331 and 341 on one side oppose to each other and the end portions (the base end portions) 332 and 342 on the other side oppose to each other.

In the elements 330 and 340, the gap formed between the base end portions 332 and 342 is formed so as to be narrower than the gap formed between the base end portions 312 and 322 in the antenna pattern 10 that is shown as the first embodiment, and the IC chip 20 is formed so as to be positioned in the gap formed between the base end portions 332 and 342 through the substrate 11.

Similarly to the first embodiment, all of the widths of the elements 330 and 340 are formed so as to have the same width.

In the second embodiment, a part of the sub-element 33 is formed at the position where it overlaps with a part of the dipole antenna 31 through the substrate 11, and a part of the sub-element 33 is formed at the position where it intersects with the short-side portions 124 and 125 of the loop portion 12 through the substrate 11.

In addition, in the second embodiment, a part of the sub-element 33 is formed at the position where it does not overlap with, through the substrate 11, the long-side portion 121 formed with the IC chip connecting portion 101 and the long-side portion 122 formed with the power feeding portion 102.

Effects of Second Embodiment

In the RFID inlay 2 according to the second embodiment, a part of the sub-element 33 overlaps with a part of the dipole antenna 31 through the substrate 11, a part of the sub-element 33 intersects with the short-side portions 124 and 125, and a part of the sub-element 33 is formed so as not to overlap with the long-side portion 121 formed with the IC chip connecting portion 10 land the long-side portion 122 formed with the power feeding portion 102.

With such a configuration, it is possible to increase the gain in the X direction in FIGS. 3 and 4, and to further increase the transmission and reception sensitivity in the X direction.

Third Embodiment

An RFID inlay 3 and an antenna pattern 50 according to a third embodiment of the present invention will be described. In the third embodiment, a sub-element 34 formed in the antenna pattern 50 is formed to have a shape in which base end portions 352 and 362 of the U-shape of elements 350 and 360 are each bent outwards of the U-shape. In other words, each of the elements 350 and 360 has a fishhook-like shape.

Figure 5:
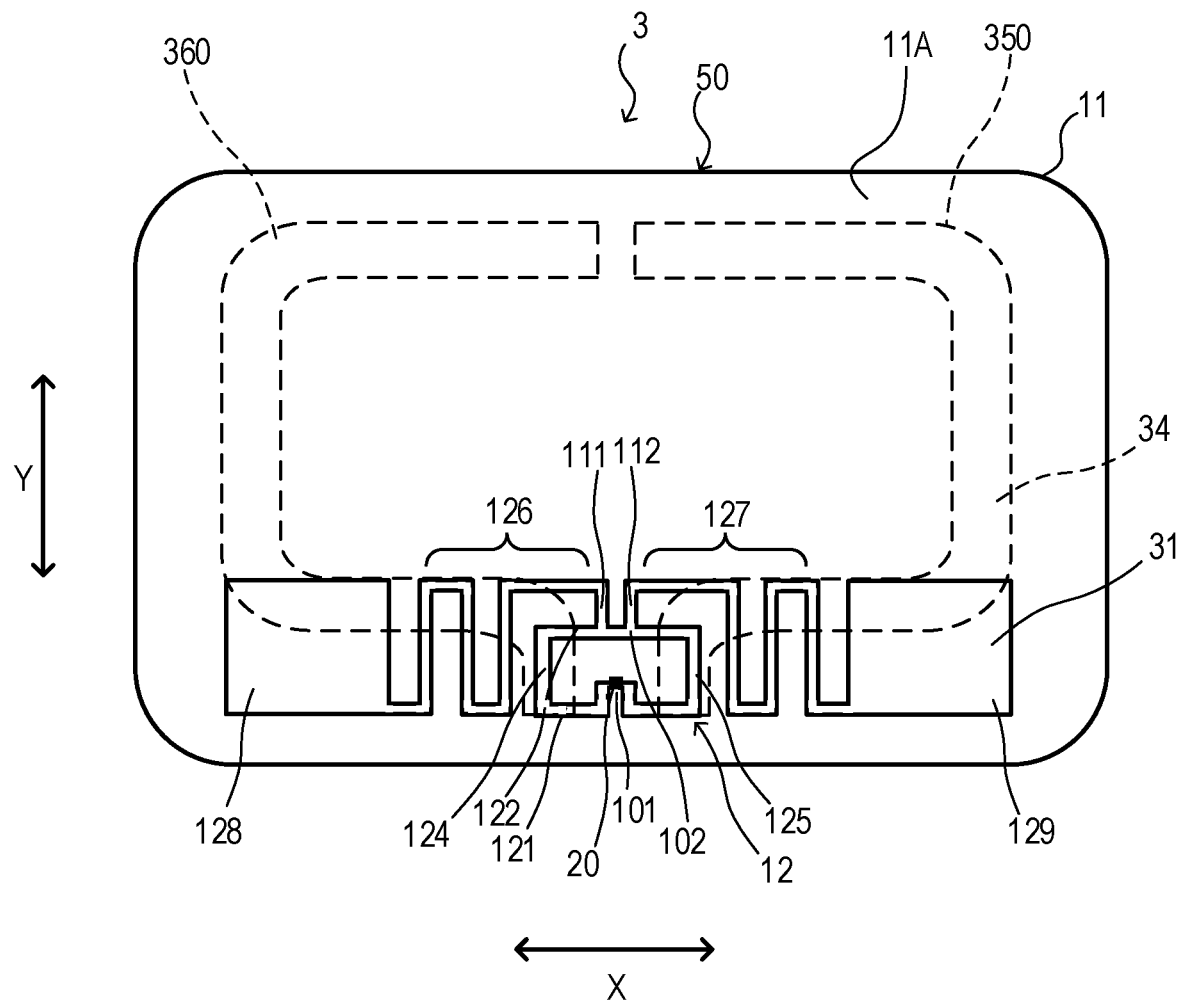
FIG. 5 is an external view for explaining the front surface of the RFID inlay according to a third embodiment.
Figure 6:
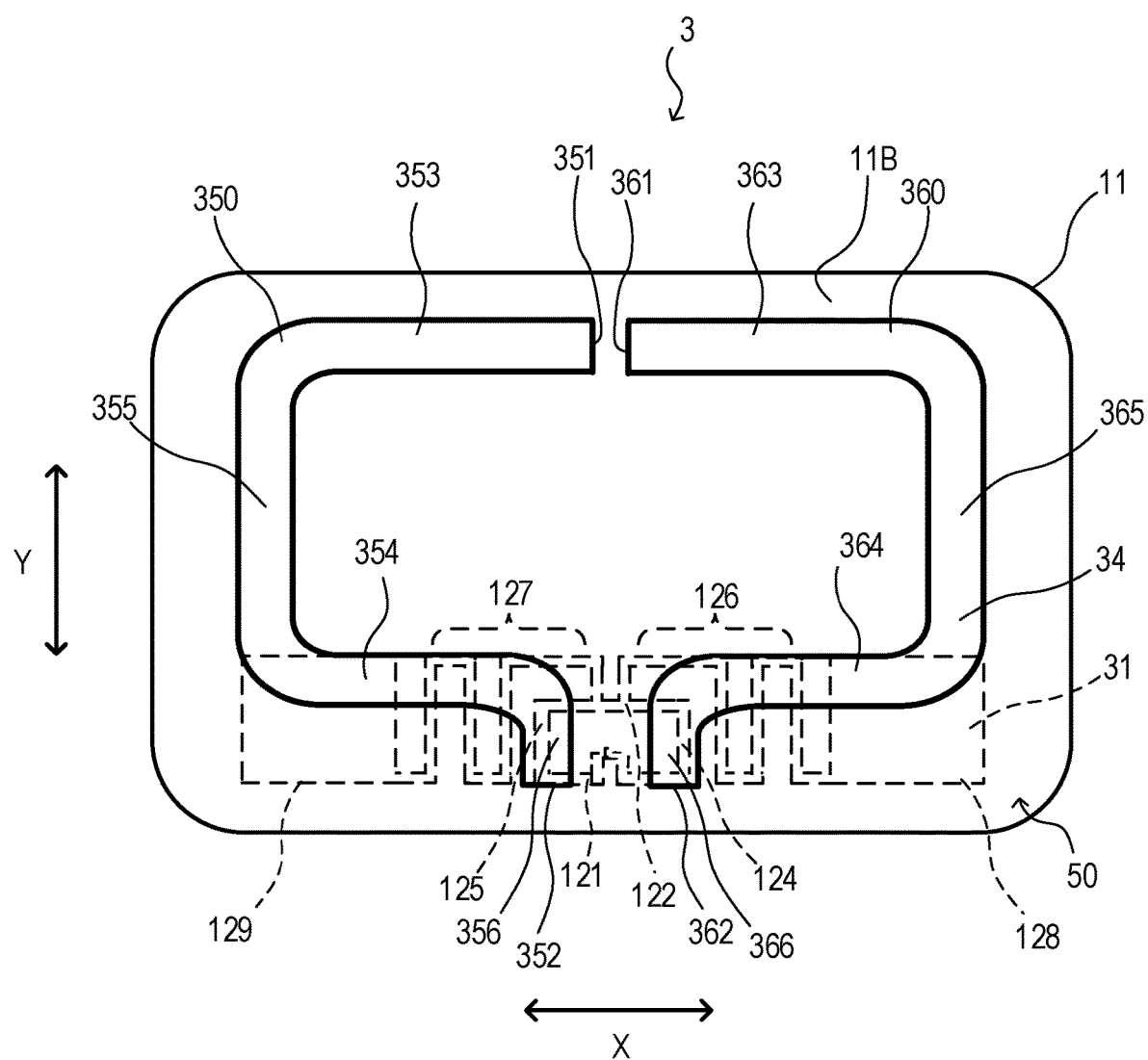
FIG. 6 is an external view for explaining the back surface of the RFID inlay according to the third embodiment.

FIG. 5 is an external view for explaining a front surface of the RFID inlay 3 according to the third embodiment. In addition, FIG. 6 is an external view for explaining a back surface of the RFID inlay 3 according to the third embodiment. Configurations that have the same functions as the configurations shown in the first embodiment are assigned the same reference signs, and detailed descriptions thereof shall be omitted.

In the RFID inlay 3 shown as the third embodiment, the antenna pattern 50 has the substrate 11, the loop portion 12 formed on the front surface 11A of the substrate 11 with the metal foil, the dipole antenna 31 formed on the front surface 11A of the substrate 11 with the metal foil, and the sub-element 34 formed on the back surface 11B.

As shown in FIG. 6, the sub-element 34 formed on the back surface 11B has a symmetrical shape on the back surface 11B and has the element 350 on one side and the element 360 on the other side.

The element 350 has parallel portions 353 and 354 that are formed in parallel with the X direction in which the dipole antenna 31 extends and a perpendicular portion 355 that joins end portions of the parallel portions 353 and 354. Furthermore, in the element 350, an end portion of the parallel portion 354 forms a bent portion 356 by being bent outwards of the substrate 11.

In addition, the element 360 has parallel portions 363 and 364 that are formed in parallel with the X direction in which the dipole antenna 31 extends and a perpendicular portion 365 that joins end portions of the parallel portions 363 and 364. Furthermore, in the element 360, an end portion of the parallel portion 364 forms a bent portion 366 by being bent outwards of the substrate 11.

The elements 350 and 360 are formed so as to be symmetrical with each other such that the end portions (the tip end portions) 351 and 361 on one side oppose to each other and the end portions (the base end portions) 352 and 362 on the other side are both directed towards the outer side of the substrate 11.

Similarly to the first embodiment, all of the widths of the elements 350 and 360 are formed so as to have the same width.

In the third embodiment, a part of the sub-element 34 is formed at the position where it overlaps with a part of the dipole antenna 31 through the substrate 11 and at the position where it overlaps with a part of the long-side portion 122 formed with the power feeding portion 102.

In other words, the parallel portion 354 in the element 350 is formed so as to overlap with a part of the dipole antenna 31 on the upper side in the Y direction on the drawings over a region from the capacitance hat 129 to the meander 127.

In addition, the parallel portion 364 in the element 360 is formed so as to overlap with a part of the dipole antenna 31 on the upper side in the Y direction on the drawings over a region from the capacitance hat 128 to the meander 126.

In addition, the bent portions 356 and 366 that are each a part of the sub-element 34 are formed at the positions so as to cover the entire region of the short-side portions 124 and 125, respectively, through the substrate 11.

Effects of Third Embodiment

With the RFID inlay 3 according to the third embodiment, the parallel portion 354 in the element 350 is formed so as to overlap with a part of the dipole antenna 31 on the upper side in the Y direction on the drawings through the substrate over a region from the capacitance hat 129 to the meander 127, the parallel portion 364 in the element 360 are formed so as to overlap with a part of the dipole antenna 31 on the upper side in the Y direction on the drawings through the substrate 11 over a region from the capacitance hat 128 to the meander 126, and the bent portions 356 and 366 that are each a part of the sub-element 34 are formed at the positions so as to cover the entire regions of the short-side portions 124 and 125, respectively, through the substrate 11.

With such a configuration, the gain in the X direction of the RFID inlay 3 in FIGS. 5 and 6 is increased, and thereby, it is possible to increase the transmission and reception sensitivity in the X direction.

[RFID Label]

Next, an RFID label 5 according to the embodiment of the present invention will be described. The RFID label 5 is formed by temporarily adhering a separator on a first surface (or a second surface) of the RFID inlay 1, which has been described as the first embodiment, with the adhesive agent and by laminating an outer substrate on the second surface.

Figure 7:
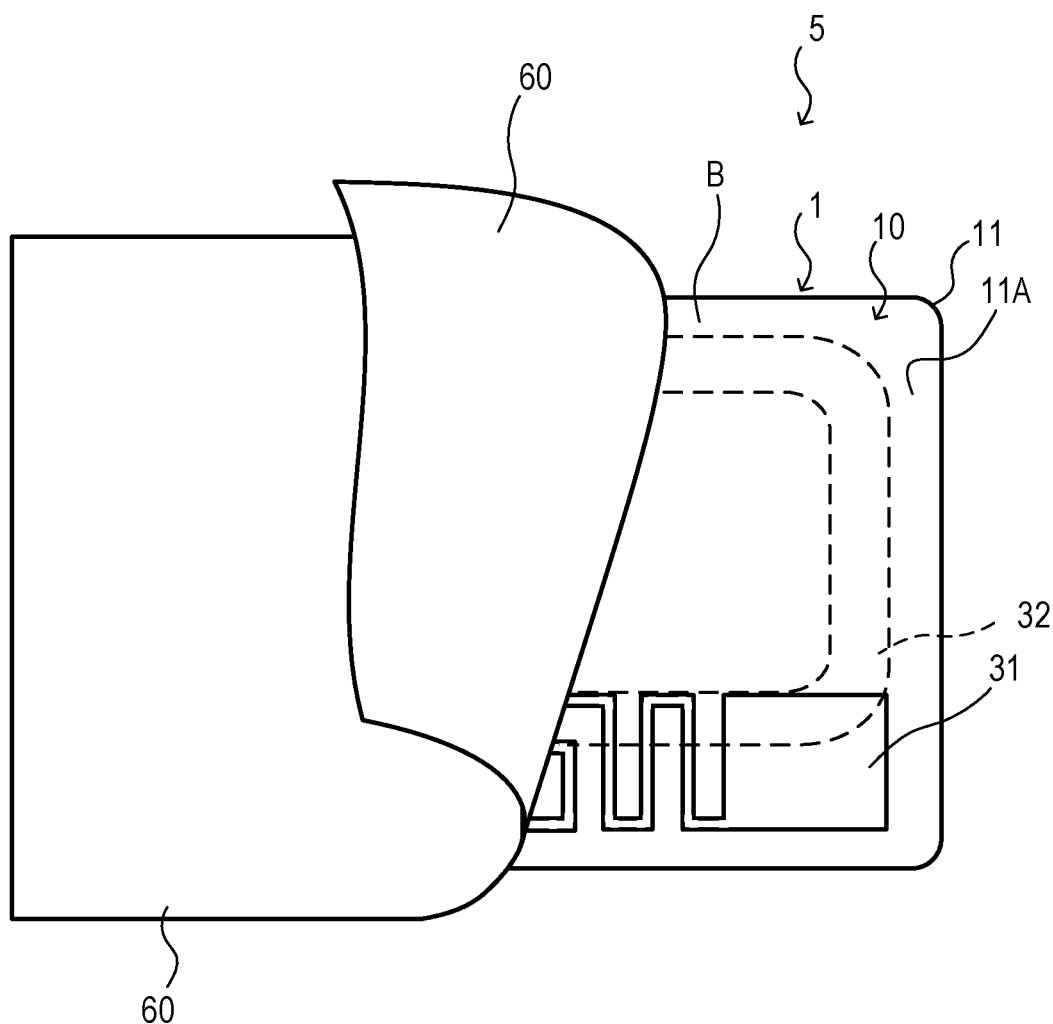
FIG. 7 is a diagram for explaining a back surface of an RFID label according to the embodiment of the present invention.

FIG. 7 is a diagram for explaining a back surface of the RFID label 5 according to the embodiment of the present invention. In addition, FIG. 8 is a diagram for explaining a front surface of the RFID label 5 according to the embodiment of the present invention.

Figure 8:
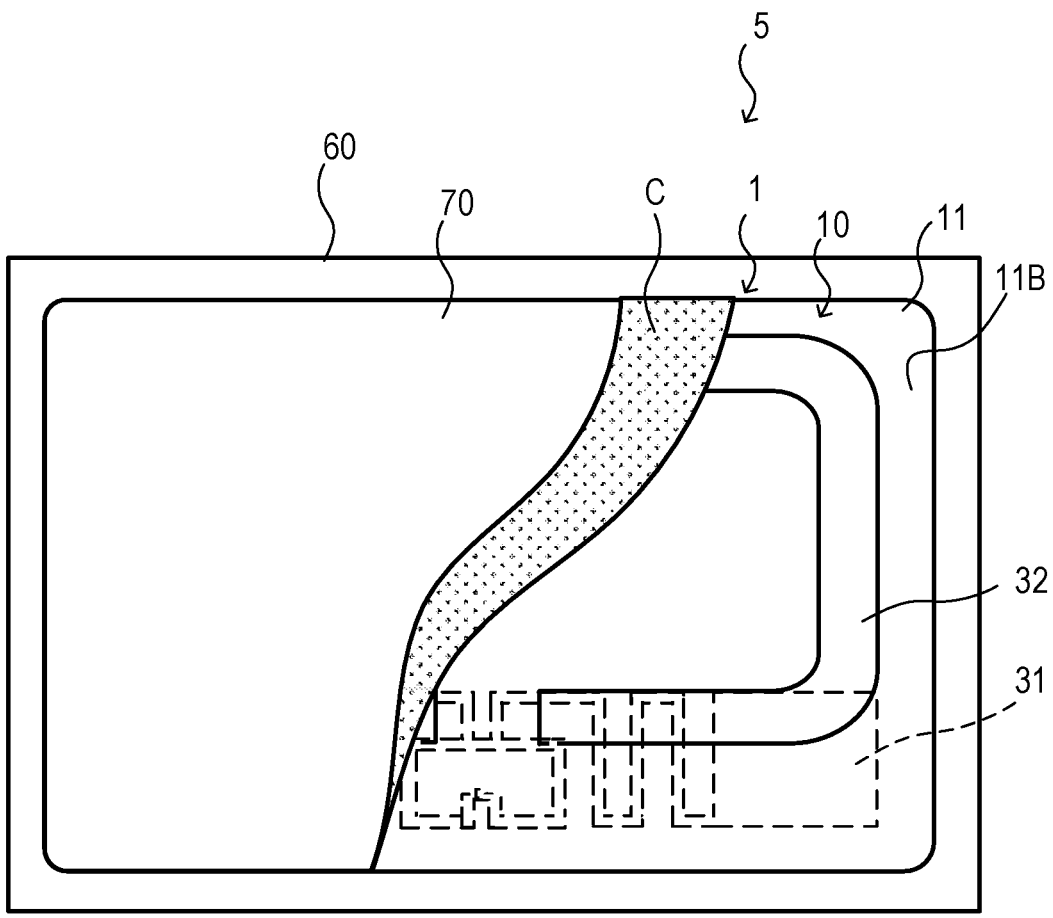
FIG. 8 is a diagram for explaining a front surface of the RFID label according to the embodiment of the present invention.

As shown in FIGS. 7 and 8, the RFID label 5 has: a separator 60 that is temporarily adhered on the front surface 11A of the substrate 11 of the RFID inlay 1, which has been described as the first embodiment, with an adhesive agent B; and an outer substrate 70 that is laminated, with a bonding agent C, on the back surface 11B on the reverse side of the surface on which the separator 60 has been temporarily adhered. Here, the outer substrate 70 serves as an information recording substrate that is a substrate having a surface suitable for printing. The outer substrate 70 may be a thermal paper.

Here, in general, as the adhesive agent B, it is possible to use an adhesive agent that can be used with the separator and a bonding agent that can be used for lamination of the substrate. In addition, in general, as the bonding agent C, it is possible to use those that can be used to laminate the substrates.

As an example of the bonding agent C, it may be possible to use emulsion bonding agents, solvent bonding agents, and hot melt bonding agents. As the adhesive, it is possible to apply acrylic bonding agents, urethane bonding agents, silicone bonding agents, rubber bonding agents, and so forth.

In addition, it may also be possible to use the adhesive agent instead of the bonding agent C. The adhesive agent that can be used in this case includes the adhesive agent such as acrylic adhesives, urethane adhesives, silicone adhesives, rubber adhesives, and so forth.

With the RFID label 5 having such a configuration, information can be printed on the outer substrate 70 having a printing surface by using a label printer, and the RFID label 5 can be used by being adhered to a product, etc. by removing the separator 60.

Because the integrated RFID inlay 1 has the sub-element 32 and antenna characteristics corresponding to those of the omnidirectional antenna can be achieved, even if the RFID label 5 according to this embodiment is used by being adhered to the product, etc., it is possible to perform the transmission and reception of data without being affected by positional relationship with a reader/writer.

In FIGS. 7 and 8, although a description has been given of a case in which the RFID inlay 1 according to the first embodiment employing the antenna pattern 10 is applied, the RFID inlay 2 that employs the antenna pattern 40 and the RFID inlay 3 that employs the antenna pattern 50 may also be applied.

In the example shown in FIGS. 7 and 8, for an application purpose in which the RFID label is adhered to a part that is not exposed to the outside, such as a case in which the attachment target is an interior of an apparatus, the outer substrate 70 may not necessarily be required.

[RFID Medium]

Next, an RFID medium 6 according to the embodiment of the present invention will be described. The RFID medium 6 is formed by laminating the outer substrates on both surfaces of the RFID inlay 1, which has been described as the first embodiment, with the adhesive agent.

Figure 9:
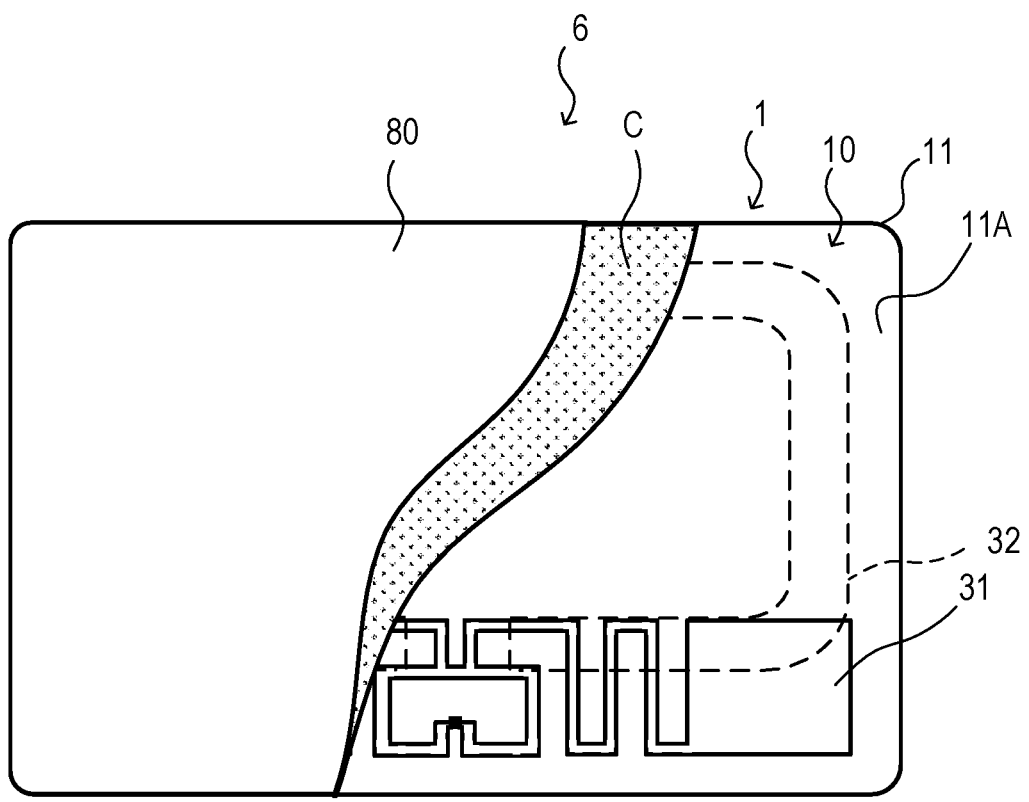
FIG. 9 is a diagram for explaining a front surface of an RFID medium according to the embodiment of the present invention.

FIG. 9 is a diagram for explaining a front surface of the RFID medium 6 according to the embodiment of the present invention. In addition, FIG. 10 is a diagram for explaining a back surface of the RFID medium 6 according to the embodiment of the present invention.

Figure 10:
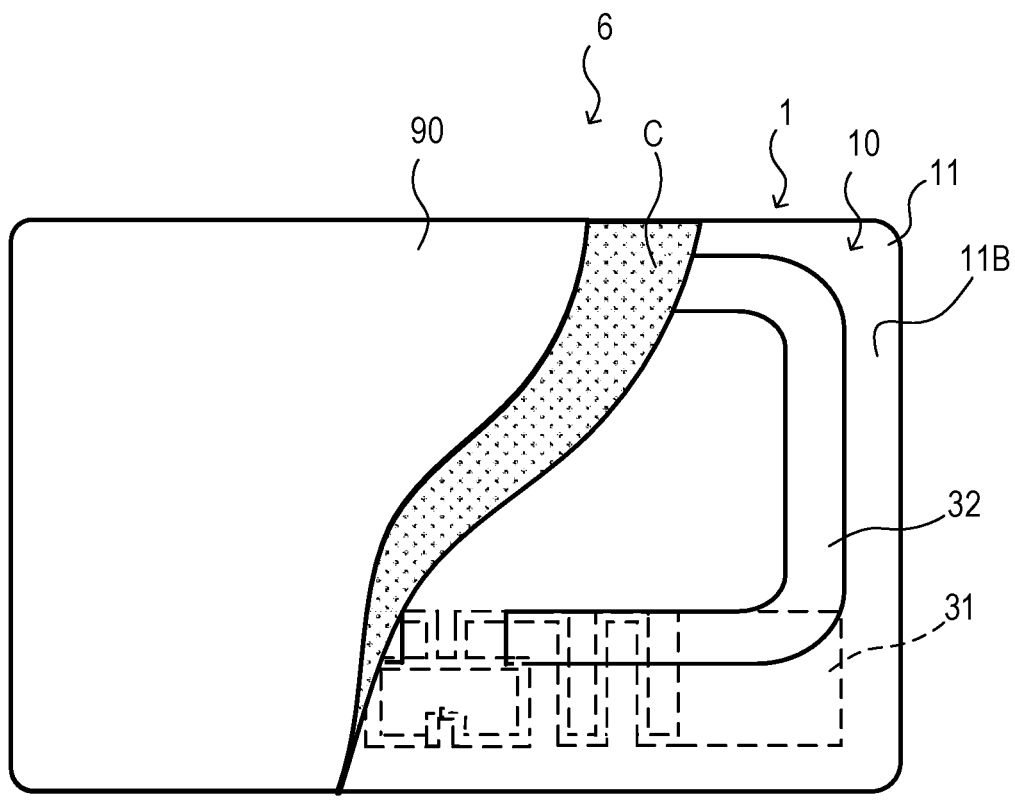
FIG. 10 is a diagram for explaining a back surface of the RFID medium according to the embodiment of the present invention.

As shown in FIGS. 9 and 10, the RFID medium 6 has an outer substrate 80 that is laminated on the front surface 11A of the substrate 11 of the RFID inlay 1, which has been described as the first embodiment, with the bonding agent C and an outer substrate 90 that is laminated on the back surface 11B with the bonding agent C. In the above, the outer substrates 80 and 90 may be of the same type. In addition, the outer substrates 80 and 90 are each the substrate for recording information and may also be the substrate having the printing surface.

An example of the RFID medium 6 having such a configuration includes an RFID tag. The RFID tag can be used by attaching it to apparel product, etc. by using a thread or a tag pin.

Because the integrated RFID inlay 1 has the sub-element 32 and antenna characteristics corresponding to those of the omnidirectional antenna can be achieved, even if the RFID medium 6 according to this embodiment is used by being attached to the apparel product, etc., it is possible to perform the transmission and reception of data without being affected by positional relationship with a reader/writer.

In FIGS. 9 and 10, although a description has been given of a case in which the RFID inlay 1 according to the first embodiment employing the antenna pattern 10 is applied, the RFID inlay 2 that employs the antenna pattern 40 and the RFID inlay 3 that employs the antenna pattern 50 may also be applied.

[Evaluation of RFID Inlay]

An evaluation for the directivity is performed on the above-described RFID inlay 1, 2, 3. In the following, a directivity evaluation test will be described.

<Measuring Device>

Figure 12:
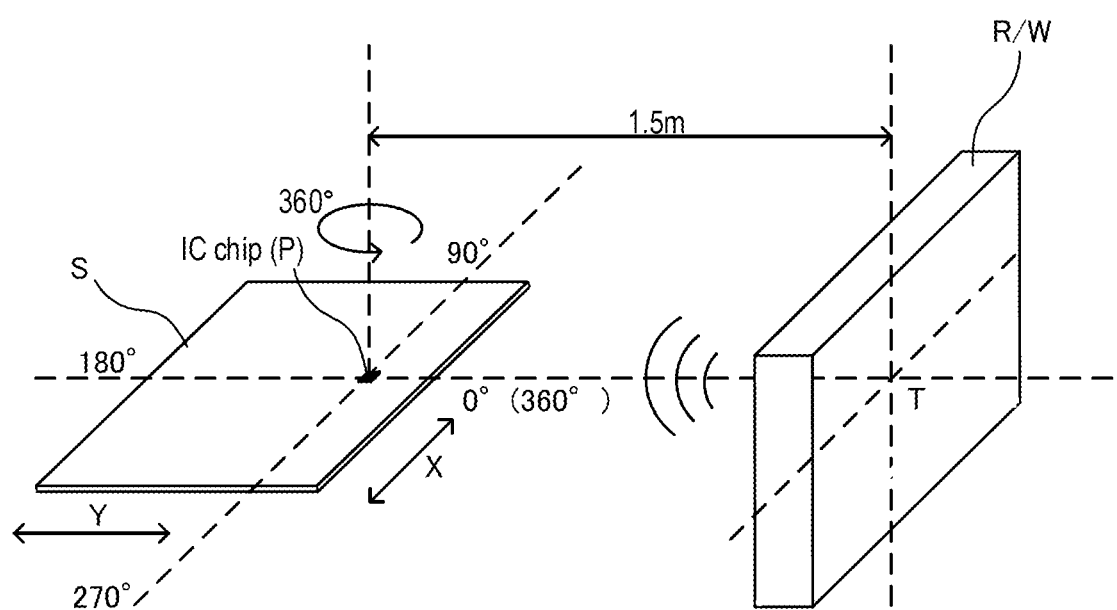
FIG. 12 is a schematic view for explaining a directivity test.

FIG. 12 is a schematic view for explaining the directivity test. A UHF frequency band RFID reader/writer (R/W) was arranged such that its antenna center is located on a position T on a circle having radius of 1.5 meter and having its center at a position P of the IC chip in the RFID tag as a test specimen S, and wave gain from the RFID tag was measured while moving the RFID reader/writer along the circle.

The position of the reader/writer the above-described circle is expressed in terms of angle relative to the starting position where the angle is set as 0°, and relationships between the angle and wave gain are shown on a chart.

<Manufacturing of Test Specimen>

Example 1

The RFID tag of Example 1 is manufactured on the basis of the RFID medium 6 according to this embodiment described above.

A basic configuration is as following: the dipole antenna 31 shown in FIG. 1 was formed with an aluminum foil having the thickness of 20 μm on the front surface of a substrate made of a PET film having the thickness of 50 μm, and on the back surface thereof, the sub-element 32 shown in FIG. 2 was formed with the aluminum foil having the thickness of 20 μm, thereby forming the antenna pattern 10. An IC (Monza R6 from Impinj, Inc.) was mounted on thus formed dipole antenna 31 to manufacture the RFID inlay 1 according to the first embodiment. In the above, the configuration on the dipole antenna 31 side had the same configuration as that of Product Number: ST7015 R6-RE01 from SATO HOLDINGS CORPORATION.

The outer substrates 80 and 90 were laminated on both surfaces of the RFID inlay 1 obtained as described above by using the bonding agent C, and thereby, the RFID tag that was used as the test specimen was obtained.

Example 2

The RFID tag used as the test specimen was obtained similarly to Example 1 except that the sub-element 33 shown in FIG. 4 was used instead of the sub-element 32.

Example 3

The RFID tag used as the test specimen was obtained similarly to Example 1 except that the sub-element 34 shown in FIG. 6 was used instead of the sub-element 32.

Comparative Example

Figure 11:
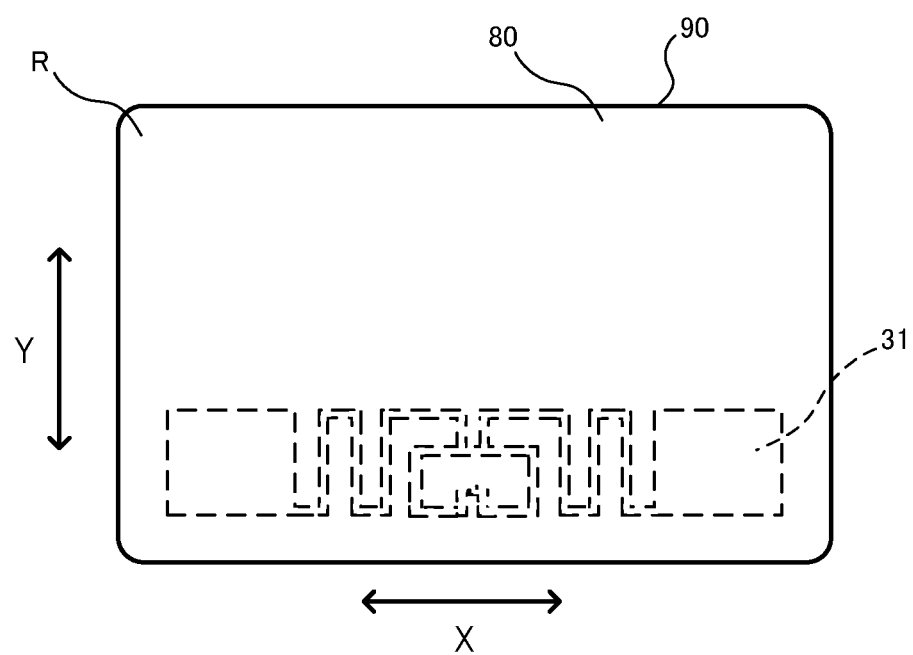
FIG. 11 is an external view for explaining the RFID medium as a comparative example used for a directivity test.

As a comparative example, an RFID tag R in which the sub-element was not provided in the RFID tag of Example 1 was prepared. FIG. 11 is an external view for explaining the RFID tag as the comparative example used for the directivity test. The RFID tag R as the comparative example is formed by laminating the outer substrates 80 and 90 on Product Number: ST7015 R6-RE01 from SATO HOLDINGS CORPORATION.

<Evaluation Results>

Figure 13:
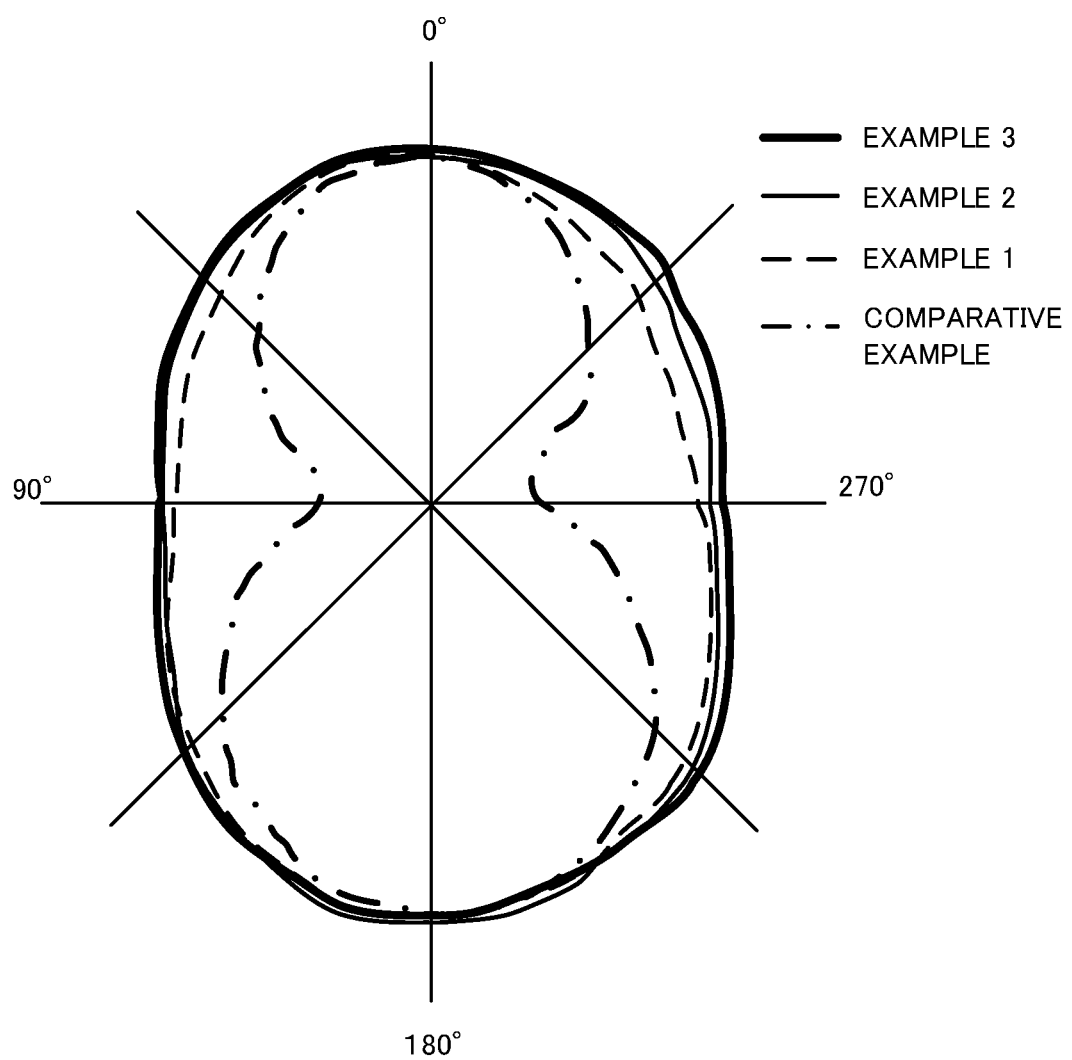
FIG. 13 is a diagram showing results of the directivity test for specific frequency.

FIG. 13 is a diagram showing results for the directivity test for the measurement frequency. As shown in FIG. 13, with the RFID tag of the comparative example that is not provided with the sub-element, the gain is weak in the direction in which the dipole antenna extends (the X direction when associated with FIG. 1). In contrast, with the RFID tags of Examples 1, 2, and 3 that are respectively provided with the sub-element 32, 33, and 34, the gain in the X direction is increased.

As described above, it was found out that, by providing the sub-element on the RFID inlay, it is possible to increase the gain in the extending direction of the dipole antenna 31 (the X direction) that is formed so as to be connected to the loop portion 12 and to extend in the X direction.

Other Embodiment

Although the embodiments of the present invention have been described in the above, the above-mentioned embodiments merely illustrate a part of application examples of the present invention, and the technical scope of the present invention is not intended to be limited to the specific configurations of the above-described embodiments.

In the first embodiment, a description has been given of a case in which the dipole antenna 31 is formed on the front surface 11A and the sub-element 32 is formed on the back surface 11B. However, the front surface 11A and the back surface 11B are named for the sake of ease of explaining, and a configuration in which, in FIGS. 1 and 2, the sub-element 32 is formed on the front surface 11A and the dipole antenna 31 is formed on the back surface 11B has equivalent advantages. The same applies to the sub-elements 33 and 34 in the second embodiment and the third embodiment.

In this embodiment, in addition to those shown in the drawings, "the U-shape" includes a shape in which the portion corresponding to the bottom portion of the U-shape has an arc-shape, and a shape in which the portion corresponding to the bottom portion of the U-shape is a straight line and in which both ends of the straight line continues to parallel portions of the U-shape by being curved.

The number or turns, turning shape, and so forth of the meanders 126 and 127 in the dipole antenna 31 shown in the embodiments can be modified appropriately, and the present invention is not limited to those illustrated.

For the RFID label 5 shown in FIGS. 7 and 8, and the RFID medium 6 shown in FIGS. 9 and 10, although a description has been given of a case in which the RFID inlay 1 according to the first embodiment employing the antenna pattern 10 is applied, the RFID inlay 2 that employs the antenna pattern 40 and the RFID inlay 3 that employs the antenna pattern 50 may also be applied.

In addition, for example, the present invention is also applicable to an RFID card in which the RFID inlay is mounted on "ID-1" standard card specified in ISO/IEC 7810. In a case in which the RFID inlay is employed to an application in which entrance and exit of a holder of the RFID card is managed and an application in which a timing of finishing of a competitor is recorded by affixing the RFID inlay to a numbered bib, etc. of the competitor, it becomes possible to perform the transmission and reception of data without being affected by the orientation of the RFID inlay and the positional relationship with the RFID reader.

The present application claims a priority based on Japanese Patent Application No. 2018-029074 filed on Feb. 21, 2018 in the Japan Patent Office, the entire contents of which are incorporated herein by reference.

The invention claimed is:

1. An antenna pattern used in a UHF frequency band RFID inlay, comprising:
   a substrate;
   a dipole antenna formed on a front surface of the substrate with a metal foil; and
   a sub-element formed on a back surface of the substrate with the metal foil, wherein
   the dipole antenna is provided with:
   a loop portion having an IC chip connecting portion to which an IC chip is connected;
   a pair of meanders configured to respectively extend from the loop portion so as to be line symmetrical by being connected to the loop portion at end portions on one side; and
   capacitance hats respectively connected to the pair of meanders, and
   the sub-element has a pair of U-shapes, the sub-element being arranged such that opening sides of the U-shapes face with each other so as to be line symmetrical, the sub-element being formed such that a part thereof overlaps with the dipole antenna through the substrate.

2. The antenna pattern according to claim 1, wherein respective base end portions in the pair of U-shapes of the sub-element are formed so as to overlap with a part of the loop portion through the substrate.

3. The antenna pattern according to claim 1, wherein the IC chip connecting portion of the loop portion is positioned, through the substrate, in one of: a gap between respective base end portions of the pair of U-shapes of the sub-element, the gap being formed by the base end portions facing with each other; and a gap between respective tip end portions of the pair of U-shapes of the sub-element, the gap being formed by the tip end portions facing with each other.

4. The antenna pattern according to claim 1, wherein the loop portion has a rectangular shape having a pair of facing long-side portions and a pair of short-side portions configured to connect end portions of the long-side portions with each other,
the IC chip connecting portion is formed on one of the long-side portions, and the meander is connected to the long-side portion facing the long-side portion on which the IC chip connecting portion is formed, and
a part of the sub-element overlaps with a part of the dipole antenna through the substrate and overlaps with a part of the long-side portion to which the meander is connected.

5. The antenna pattern according to claim 1, wherein the loop portion has a rectangular shape having a pair of facing long-side portions and a pair of short-side portions configured to connect end portions of the long-side portions,
the IC chip connecting portion is formed on one of the long-side portions, and the meander is connected to the long-side portion facing the long-side portion on which the IC chip connecting portion is formed, and
a part of the sub-element overlaps with a part of the dipole antenna through the substrate and intersects with the short-side portion, but does not overlap with the long-side portion to which the IC chip connecting portion is formed and the long-side portion to which the meander is connected.

6. The antenna pattern according to claim 1, wherein the loop portion has a rectangular shape having a pair of facing long-side portions and a pair of short-side portions configured to connect end portions of the long-side portions,
the IC chip connecting portion is formed on one of the long-side portions, and the meander is connected to the long-side portion facing the long-side portion on which the IC chip connecting portion is formed, and
a part of the sub-element overlaps with a part of the dipole antenna through the substrate, covers an entire region of the short-side portion, and overlaps with a part of the long-side portion to which the IC chip connecting portion is formed and a part of the long-side portion to which the meander is connected.

7. A UHF frequency band RFID inlay comprising:
the antenna pattern according to claim 1 and
the IC chip connected to the IC chip connecting portion in the antenna pattern.

8. An RFID label wherein a separator is temporarily adhered on one of surfaces of the UHF frequency band RFID inlay according to claim 7 with an adhesive agent.

9. An RFID label wherein a separator is temporarily adhered on one of surfaces of the UHF frequency band RFID inlay according to claim 7 with an adhesive agent and an information recording substrate is laminated on a surface on a reverse side of the surface on which the separator is temporarily adhered.

10. An RFID medium wherein both surfaces of the UHF frequency band RFID inlay according to claim 7 are sandwiched by a plurality of outer substrates with a bonding agent.

* * * * *